US008654135B1

(12) United States Patent
Danskin

(10) Patent No.: US 8,654,135 B1
(45) Date of Patent: Feb. 18, 2014

(54) A-BUFFER COMPRESSION FOR DIFFERENT COMPRESSION FORMATS

(75) Inventor: John M. Danskin, Providence, RI (US)

(73) Assignee: NVIDIA Corporation, Santa Clara, CA (US)

( * ) Notice: Subject to any disclaimer, the term of this patent is extended or adjusted under 35 U.S.C. 154(b) by 879 days.

(21) Appl. No.: 12/634,460

(22) Filed: Dec. 9, 2009

Related U.S. Application Data

(63) Continuation-in-part of application No. 12/208,204, filed on Sep. 10, 2008, now Pat. No. 8,130,223.

(51) Int. Cl.
*G06T 1/60* (2006.01)
*G09G 5/00* (2006.01)

(52) U.S. Cl.
USPC .......................................... 345/530; 345/611

(58) Field of Classification Search
None
See application file for complete search history.

(56) References Cited

U.S. PATENT DOCUMENTS

| | | | |
|---|---|---|---|
| 6,597,363 B1 * | 7/2003 | Duluk et al. .................. | 345/506 |
| 6,697,063 B1 | 2/2004 | Zhu | |
| 7,102,646 B1 | 9/2006 | Rubinstein et al. | |
| 7,167,181 B2 | 1/2007 | Duluk et al. | |
| 7,170,515 B1 | 1/2007 | Zhu | |
| 7,184,040 B1 | 2/2007 | Tzvetkov | |
| 7,218,317 B2 | 5/2007 | Liao et al. | |
| 7,286,134 B1 | 10/2007 | Van Dyke et al. | |
| 2003/0095127 A1 | 5/2003 | Blais | |
| 2004/0161146 A1 * | 8/2004 | Van Hook et al. ............ | 382/166 |
| 2006/0170703 A1 | 8/2006 | Liao | |
| 2006/0209078 A1 | 9/2006 | Anderson et al. | |
| 2009/0091577 A1 | 4/2009 | Brothers | |

OTHER PUBLICATIONS

Office Action in U.S. Appl. No. 11/950,352, mailed Feb. 15, 2011.
Office Action in U.S. Appl. No. 11/950,355, mailed Feb. 15, 2011.
Office Action, U.S. Appl. No. 12/208,211 dated Jul. 20, 2011.
Office Action, U.S. Appl. No. 12/208,204 dated Jun. 8, 2011.
Greens, "Hierarchical Rendering of Complex Environments", A dissertation submitted in partial satisfaction of the requirements for the degree of Doctor of Philosophy in Computer and Information Sciences, University of California, Santa Cruz, Jun. 1995.
Office Action, U.S. Appl. No. 12/208,211, dated Nov. 23, 2011.

* cited by examiner

*Primary Examiner* — Xiao M. Wu
*Assistant Examiner* — Yingchun He
(74) *Attorney, Agent, or Firm* — Patterson + Sheridan, L.L.P.

(57) ABSTRACT

One embodiment of the present invention sets forth a technique for efficiently creating and accessing an A-Buffer that supports multi-sample compression techniques. The A-Buffer is organized in stacks of uniformly-sized tiles, wherein the tile size is selected to facilitate compression techniques. Each stack represents the samples included in a group of pixels. Each tile within a stack represents the set of sample data at a specific per-sample rendering order index that are associated with the group of pixels represented by the stack. Advantageously, each tile includes tile compression bits that enable the tile to maintain data using existing compression formats. As the A-Buffer is created, a corresponding stack compression buffer is also created. For each stack, the stack compression buffer includes a bit that indicates whether all of the tiles in the stack are similarly compressed and, consequently, whether the GPU may operate on the stack at an efficient per pixel granularity.

24 Claims, 12 Drawing Sheets

Sample
Depth
Complexity
Image
360

| Maximum PSROI 370-0,0 | Maximum PSROI 370-1,0 | | Maximum PSROI 370-K-2, 0 | Maximum PSROI 370-K-1, 0 |
|---|---|---|---|---|
| Maximum PSROI 370-0,1 | Maximum PSROI 370-1,1 | . . . | Maximum PSROI 370-K-2, 1 | Maximum PSROI 370-K-1, 1 |
| . . . | | | . . . | |
| Maximum PSROI 370-0, L-2 | Maximum PSROI 370-1, L-2 | | Maximum PSROI 370-K-2, L-2 | Maximum PSROI 370-K-1, L-2 |
| Maximum PSROI 370-0, L-1 | Maximum PSROI 370-1, L-1 | . . . | Maximum PSROI 370-K-2, L-1 | Maximum PSROI 370-K-1, L-1 |

Figure 5

A-BUFFER COMPRESSION FOR DIFFERENT COMPRESSION FORMATS

CROSS-REFERENCE TO RELATED APPLICATIONS

This application is a continuation-in-part of co-pending U.S. patent application Ser. No. 12/208,204, filed Sep. 10, 2008, hereby incorporated herein by reference.

BACKGROUND OF THE INVENTION

1. Field of the Invention

The present invention relates generally to the field of graphics processing and, more specifically, to A-Buffer compression for two-color compression format.

2. Description of the Related Art

In conventional approaches for rendering an image, a graphics processing unit (GPU) determines a color associated with each pixel of the rendered image. The color of a pixel is determined based on sample data associated with one or more polygons covering the pixel, where each sample data corresponds to a different location within the image. For example, for a pixel that is covered by first and second objects and includes four sample data, one of the sample data may reflect the color of the first object, and three of the sample data may reflect the color of the second object. Color information from each of the four sample data may contribute to the color of the pixel using well-known techniques that improve image quality by, among other things, reducing edge artifacts in images. An example of such a technique is multi-sample anti-aliasing.

GPUs often increase the efficiency of operations such as multi-sample anti-aliasing by using a variety of compression techniques to reduce memory bandwidth and computational load. For example, if each of the four samples included in a particular pixel has one of two colors, then the GPU may determine that the pixel is compressible and may represent all four samples (i.e., the pixel) using the color information needed to represent only two colors. Further, the GPU groups proximally located pixels into an image tile for efficient processing. If all of the pixels included in an image tile are compressible, then the GPU determines that the image tile is compressible and represents the image tile using a reduced amount of color information. Reducing the data used to represent the pixels and image tiles reduces the memory bandwidth used when accessing the pixels and tiles in memory.

To manage a large amount of sample data, the GPU may generate an A-Buffer—a memory structure that maintains sample data associated with each polygon that intersects the pixels of an image frame being rendered. Traditionally, an A-Buffer stores linked lists of the sample data, where each linked list is associated with different sample data corresponding to a different pixel. One drawback to storing sample data in an A-buffer is that compression techniques that are often implemented by GPUs to reduce memory bandwidth and increase efficiency cannot be supported in the A-Buffer due to the discrete nature of the A-Buffer.

As the foregoing illustrates, what is needed in the art is a more effective technique for creating and accessing an A-Buffer that can stored compressed sample data.

SUMMARY OF THE INVENTION

One embodiment of the present invention sets forth a method for storing in a graphics processing unit (GPU) memory pixel data associated with one or more pixels in an image. The method includes the steps of identifying within a buffer residing within the GPU memory a first stack associated with a first set of pixels included in the image, wherein each stack stored in the buffer is associated with a different set of pixels included in the image, populating a first tile included in the first stack with pixel data associated with a first subset of pixels included in the first set of pixels, wherein each tile included in the first stack stores pixel data associated with a different subset of pixels included in the first set of pixels, generating tile compression information associated with the first tile based on the pixel data associated with the first subset of pixels, wherein the tile compression information specifies a compression format used to compress the pixel data associated with the first subset of pixels and a compression state associated with each pixel in the first subset of pixels, and storing the tile compression information in the first tile.

One advantage of the disclosed method is that the compression information, including the compression format and the compression bits, in each tile allows the GPU to create a stack compression buffer indicating whether the tiles in a stack are all similarly compressible. Such a technique enables the GPU to fully utilize existing compression techniques that reduce memory bandwidth and increase computational efficiency. Consequently, the overall performance of the graphics pipeline is improved.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 is a conceptual diagram of a sample depth complexity image used to determine the structure of the A-Buffer of FIG. 3A, according to one embodiment of the invention;

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
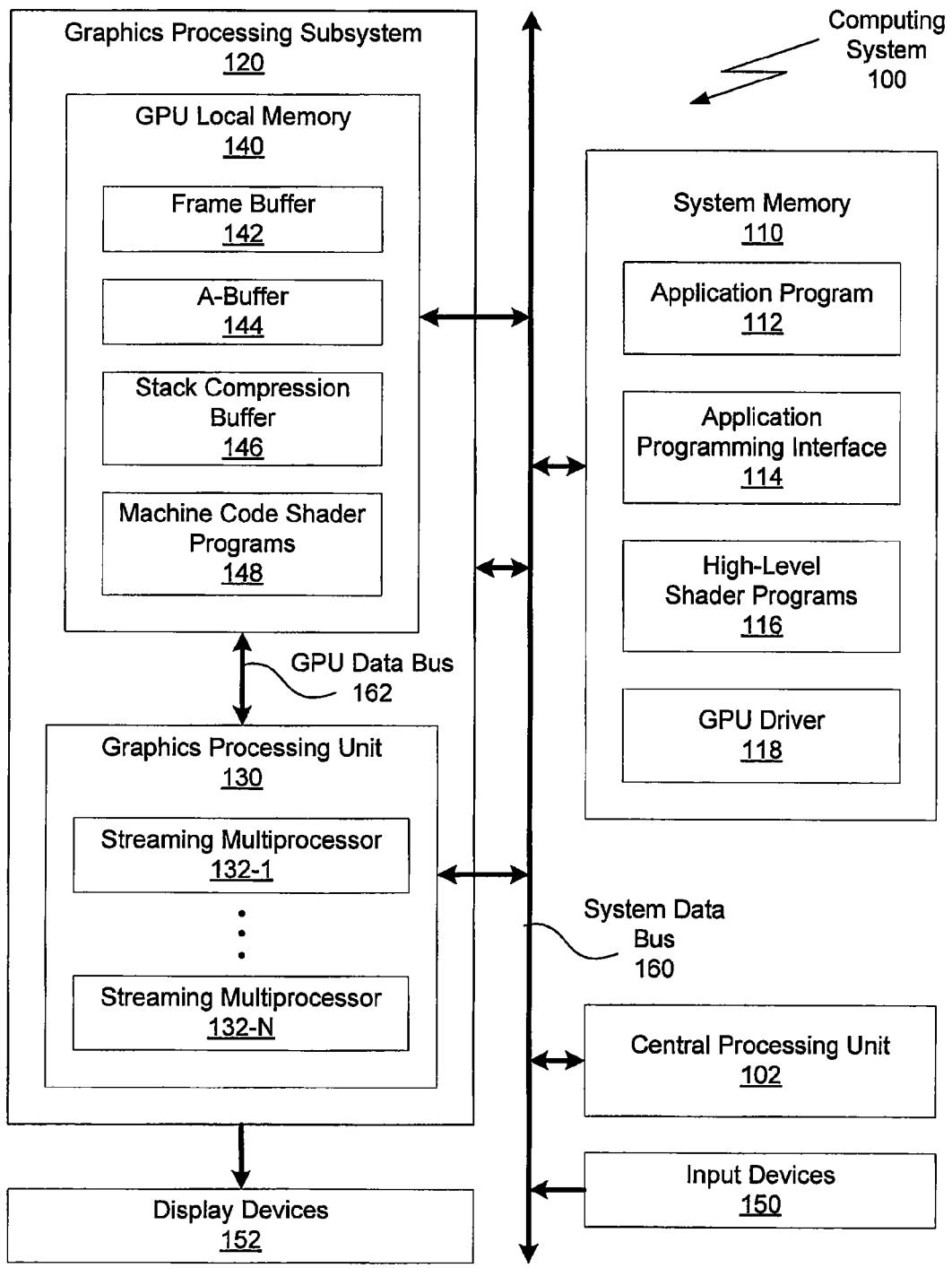
FIG. 1 is a conceptual diagram of a computing system in which one or more aspects of the invention may be implemented.

FIG. 1 is a conceptual diagram of a computing system 100 in which one or more aspects of the invention may be implemented. As shown, the computing system 100 includes a system data bus 160, a central processing unit (CPU) 102, input devices 150, a system memory 110, a graphics processing subsystem 120, and display devices 152. In alternate embodiments, the CPU 102, portions of the graphics processing subsystem 120, the system data bus 160, or any combination thereof, may be integrated into a single processing unit. Further, the functionality of the graphics processing subsystem 120 may be included in a chipset or in some other type of special purpose processing unit or co-processor.

The system data bus 160 connects the CPU 102, the input devices 150, the system memory 110, and the graphics processing subsystem 120. In alternate embodiments, the system memory 110 may connect directly to the CPU 102. The CPU 102 receives user input from the input devices 150, executes programming instructions stored in the system memory 110, operates on data stored in the system memory 110, and configures the graphics processing subsystem 120 to perform specific tasks in the graphics pipeline. The system memory 110 typically includes dynamic random access memory (DRAM) used to store programming instructions and data for processing by the CPU 102 and the graphics processing subsystem 120. The graphics processing subsystem 120 receives instructions transmitted by the CPU 102 and processes the instructions in order to render and display graphics images on the display devices 152.

The system memory 110 includes an application program 112, an application programming interface (API) 114, high-level shader programs 116, and a graphics processing unit (GPU) driver 118. The application program 112 generates calls to the API 114 in order to produce a desired set of results, typically in the form of a sequence of graphics images. The application program 112 also transmits one or more high-level shading programs 116 to the API 114 for processing within the GPU driver 118. The high-level shading programs 116 are typically source code text of high-level programming instructions that are designed to operate on one or more shaders within the graphics processing subsystem 120. The API 114 functionality is typically implemented within the GPU driver 118. The GPU driver 118 is configured to translate the high-level shading programs 116 into machine code shading programs that are typically optimized for a specific type of shader (e.g., vertex, geometry, or fragment).

The graphics processing subsystem 120 includes a graphics processing unit (GPU) 130, a GPU local memory 140, and a GPU data bus 162. The GPU 130 is configured to communicate with the GPU local memory 140 via the GPU data bus 162. The GPU 130 may receive instructions transmitted by the CPU 102, process the instructions in order to render graphics data and images, and store these images in the GPU local memory 140. Subsequently, the GPU 130 may display certain graphics images stored in the GPU local memory 140 on the display devices 152.

The GPU 130 includes one or more streaming multiprocessors 132. Each of the streaming multiprocessors 132 is capable of executing a relatively large number of threads concurrently. Advantageously, each of the streaming multiprocessors 132 can be programmed to execute processing tasks relating to a wide variety of applications, including but not limited to linear and nonlinear data transforms, filtering of video and/or audio data, modeling operations (e.g. applying of physics to determine position, velocity, and other attributes of objects), and so on. Furthermore, each of the streaming multiprocessors 132 may be configured as one or more programmable shaders (e.g., vertex, geometry, or fragment) each executing a machine code shading program (i.e., a thread) to perform image rendering operations. The GPU 130 may be provided with any amount GPU local memory 140, including none, and may use GPU local memory 140 and system memory 110 in any combination for memory operations.

The GPU local memory 140 is configured to include machine code shader programs 148, an A-Buffer 144, a stack compression buffer 146, and a frame buffer 142. The machine code shader programs 148 may be transmitted from the GPU driver 118 to the GPU local memory 140 via the system data bus 160. The machine code shader programs 148 may include a machine code vertex shading program, a machine code geometry shading program, a machine code fragment shading program, or any number of variations of each. The A-Buffer 144 may be used to store a collection of sample data associated with each polygon that intersects the pixels in an image frame that is being rendered for display. The stack compression buffer 146 may be used to store information related to the A-Buffer for purposes of compression. The frame buffer 142 stores data for at least one two-dimensional surface that may be used to drive the display devices 152. Furthermore, the frame buffer 142 may include more than one two-dimensional surface so that the GPU 130 can render to one two-dimensional surface while a second two-dimensional surface is used to drive the display devices 152.

The display devices 152 are one or more output devices capable of emitting a visual image corresponding to an input data signal. For example, a display device may be built using a cathode ray tube (CRT) monitor, a liquid crystal display, or any other suitable display system. The input data signals to the display devices 152 are typically generated by scanning out the contents of one or more frames of image data that is stored in the frame buffer 142.

Figure 2:
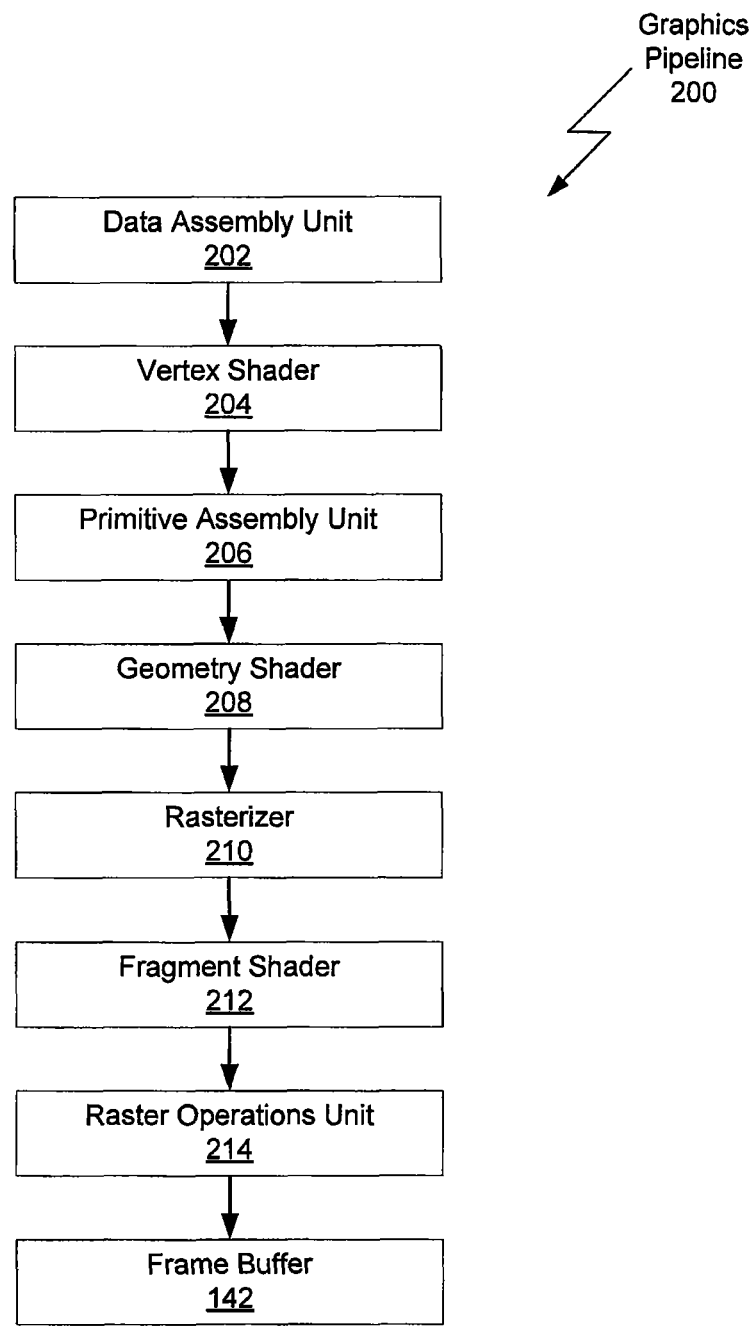
FIG. 2 is a conceptual diagram of a programmable graphics pipeline residing within the GPU of FIG. 1, according to one embodiment of the invention.

FIG. 2 is a conceptual diagram of a programmable graphics pipeline 200 residing within the GPU 130 of FIG. 1, according to one embodiment of the invention. The graphics pipeline 200 is configured to transform 3-D images into 2-D images. As shown, the graphics pipeline 200 includes a data assembly unit 202, a vertex shader 204, a primitive assembly unit 206, a geometry shader 208, a rasterizer 210, a fragment shader 212, a raster operations unit 214, and the frame buffer 142 of FIG. 1.

The data assembly unit 202 is a fixed-function unit that collects vertex data from the application program 112 for high-order surfaces, primitives, and the like, and passes the vertex data to the vertex shader 204. The data assembly unit 202 may gather data from buffers stored within system memory 110 and the GPU local memory 140 as well as from API calls from the application program 112 used to specify vertex attributes. The vertex shader 204 is a programmable execution unit that is configured to execute a machine code vertex shading program, processing vertex data as specified by the vertex shading program. For example, the vertex shader 204 may be programmed to transform the vertex data from an object-based coordinate representation (object space) to an alternatively based coordinate system such as world space or normalized device coordinates (NDC) space. The vertex processing unit 204 may access data that is stored in GPU local memory 140.

The primitive assembly unit 206 is a fixed-function unit that receives processed vertex data from vertex shader 204 and constructs graphics primitives, e.g., points, lines, triangles, or the like, for processing by the geometry shader 208. In alternative embodiments, a second primitive assembler (not shown) may be included subsequent to the geometry shader 208 in the data flow through the GPU 130. The geometry shader 208 is a programmable execution unit that is configured to execute a machine code geometry shading program, processing graphics primitives received from the primitive assembly unit 206 as specified by the geometry shading program. For example, in addition to well-known per-primitive operations such as clipping, the geometry shader 208 may be programmed to subdivide the graphics primitives into one or more new graphics primitives and calculate parameters, such as plane equation coefficients, that are used when the new graphics primitives are rasterized. The geometry shader 208 may access data that is stored in the GPU local memory 140. The geometry shader 208 outputs the parameters and new graphics primitives to the rasterizer 210.

The rasterizer 210 is a fixed-function unit that scans the new graphics primitives and outputs fragments, each containing fragment data, which may include raster position or interpolated vertex attributes, such as texture coordinates and opacity, to the fragment shader 212.

The fragment shader 212 is a programmable execution unit that is configured to execute a machine code fragment shading program, processing fragments received from rasterizer 210 as specified by the machine code fragment shading program. For example, the fragment shader 212 may be programmed to perform operations such as perspective correction, shading, blending, and the like, to produce shaded fragments that are output to the raster operations unit 214. The fragment shading engine 212 may access data that is stored in buffers in the GPU local memory 140, such as the A-Buffer 144 and the stack compression buffer 146. The raster operations unit 214 optionally performs fixed-function computations such as near and far plane clipping and raster operations, such as stencil, z test, blending and the like, and outputs pixel data as processed graphics data for storage in a buffer in the GPU local memory 140, such as the A-Buffer 144 or the frame buffer 142. Together, the rasterizer 210, the fragment shader 212 and the raster operations unit 214 represent the fragment processing domain of the GPU 130, where the raster operations unit 214 may be used to operate on individual pixels or small squares of pixels, and the fragment shader 212 may be programmed to iterate across groups of pixels. Further, the fragment shader 212 and the raster operations unit 214 may be configured to treat samples as pixels.

Figure 3A:
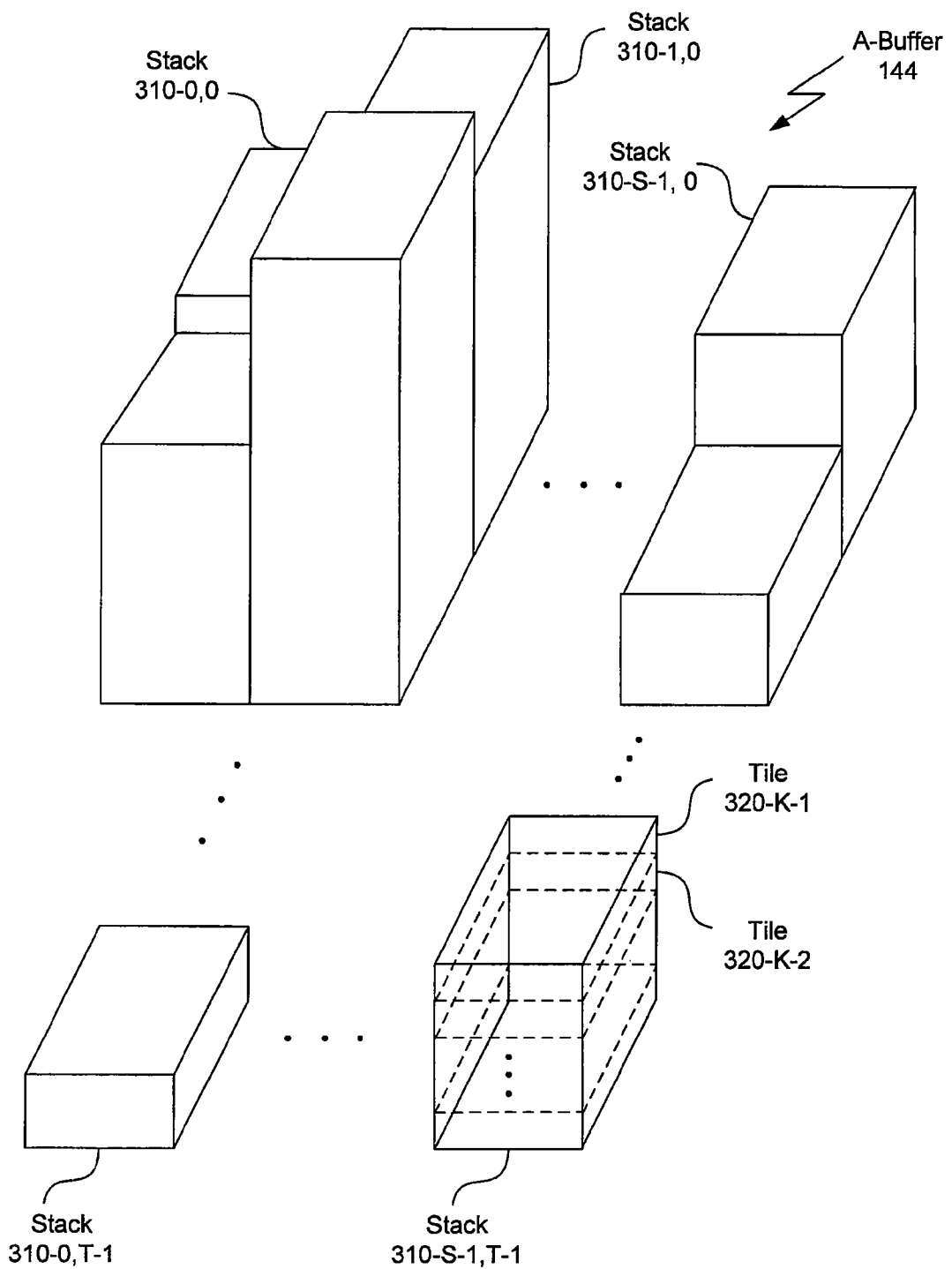
FIG. 3A is a conceptual diagram of the A-Buffer of FIG. 1, according to one embodiment of the invention.

FIG. 3A is a conceptual diagram of the A-Buffer of FIG. 1, according to one embodiment of the invention. As shown, the A-Buffer 144 may include one or more stacks 310. Each of the stacks 310 may be configured to represent the sample data associated with a different group of proximally located N-by-M pixels in an image frame. Together, the stacks 310 may represent all of the sample data associated with all of the pixels in the image frame.

As shown in detail for the array 310-S-1,T-1, each of the stacks 310 may be subdivided into any number of two-dimensional tiles 320. The size of the tiles 320, and consequently the size of the group of pixels represented by each stack 310, may be chosen by the designer and may be uniform across the A-Buffer 144. The size of the tiles 320 in conjunction with the size of the image frame may determine the number of the stacks 310 in the A-Buffer 144. Suppose, for example, that a tile size of eight-by-four samples is chosen and that each pixel includes four samples, arranged in a two-by-two configuration. And, suppose the size of a given image frame is eight-by-four pixels. The pixels in the image frame may be divided into four subsets of four-by-two pixels, and the A-Buffer 144 may be configured to include four stacks 310 of eight-by-four tiles 320, each tile 320 including eight pixels represented by thirty-two samples. In other embodiments, the tile size may be chosen to be more or less than eight-by-four, and the number of stacks 310 in the A-Buffer 144 may be more or less than four. Furthermore, the tiles may be chosen to be the units of compression and, consequently, the size of the tiles 320 may be chosen in any technically feasible fashion to facilitate various compression techniques.

Figure 3B:
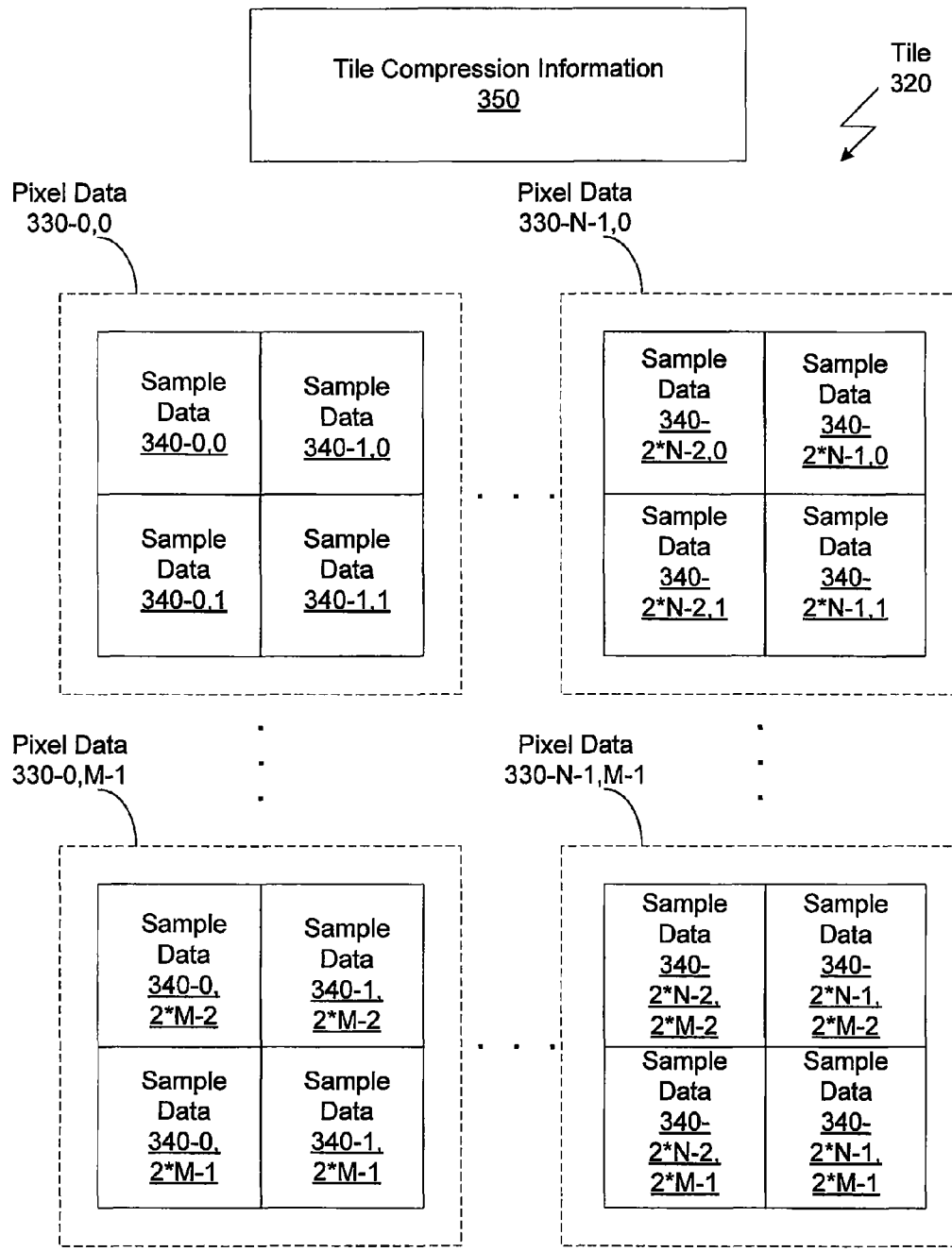
FIG. 3B is a conceptual diagram of a tile in the A-Buffer of FIG. 3A, according to one embodiment of the invention.

FIG. 3B is a conceptual diagram of a tile 320 in the A-Buffer 144 of FIG. 3A, according to one embodiment of the invention. As shown, each tile 320 may be configured to include an N-by-M set of pixel data 330 selected and arranged to correspond to the N-by-M group of pixels represented by a specific stack 310. Similarly, each pixel may be subdivided into an F-by-G set of samples, and each pixel data 330 may be configured to include an F-by-G set of sample data 340 selected and arranged to correspond to the F-by-G samples included in the pixel represented by the pixel data 330. Consequently, the total number of sample data 340 included in each tile 320 is F*N-by-G*M. In the example of FIG. 3B, each pixel is subdivided into a two-by-two set of samples and, therefore, the total number of sample data 340 included in each tile 320 is 2*N-by-2*M.

Each tile 320 may be further configured to include only sample data 340 at a given per-sample rendering order index (PSROI). In such a configuration, the tiles 320 included in a given stack 310 may, together, represent all of the sample data 340 associated with the N-by-M group of pixels represented by the stack 310, where each of the tiles 320 represents the subset of the sample data 340 at a particular PSROI. As set forth in greater detail herein, organizing the sample data 340 in such a manner, by both PSROI and associated pixel proximity, optimizes the locality of memory accesses.

Referring back now to FIG. 3A, the number of tiles 320 in each stack 310 may differ. Since each of the tiles 320 corresponds to a specific PSROI, the number of tiles 320 in a given stack 310 corresponds to the maximum depth complexity associated with any of the samples represented by the stack 310. For example, if a given stack 310 were to represent samples having two different per-sample rendering order indices, such as indices zero and one, then the stack 310 would include two tiles 320 that include one or more sample data 340 at each of these two indices. Similarly, if a given stack 310 were to include three tiles 320, then the stack 310 would include sample data 340 at three different PSROI, such as indices zero, one, and two. The GPU 130 is configured to assign tiles to each of the stacks 310, calculating the maximum depth complexity associated with the F*N-by-G*M group of samples represented by a particular stack 310 to determine the appropriate number of tiles to allocate for that stack 310.

When populating the A-Buffer 144 with sample data 340, the GPU 130 is configured to optimally pack the sample data 340 by allowing the set of sample data 340 included in each pixel data 330 to represent the intersection of one or more polygons with that particular pixel. Suppose, for example, each pixel includes four samples and four polygons intersect a particular pixel. If each polygon covers a different one of the samples included in the pixel, then the PSROI for each of the four samples would be one. And, the GPU 130 may configure a single pixel data included in a single tile included in the A-Buffer to represent the intersection of all four polygons with this particular pixel.

As shown in detail in FIG. 3B, each tile 320 also includes tile compression information 350 reflecting any technically feasible compression format that is supported by the GPU 130. The tile compression information 350 indicates whether the sample data 340 is stored in a compressed form and, if so, the specific compression format to which the sample data 340 is compressed.

As is well-known, accessing a compressed tile typically involves transferring less data than accessing an uncompressed tile. Consequently, the memory bandwidth used to access compressed tiles included in the A-Buffer 144 is usually less than the memory bandwidth used to access uncompressed tiles included in the A-Buffer 144. In alternate embodiments, the tiles may not include the tile compression bits, and the tile compression bits may be stored in another location that is accessible by the GPU. In other embodiments, the A-Buffer may not support compressed tiles and, consequently, the tile compression bits may not exist.

Although any number of the tiles 320 included in the A-Buffer 144 may be compressed in various embodiments, the computing system 100 is configured to ensure that the A-Buffer 144 is large enough to store all of the tiles 320 included in the A-Buffer 144 in an uncompressed fashion. Again, the computing system 100 determines the structure of the A-Buffer 144 by the size and complexity of each image frame. In one embodiment, the CPU 102 preallocates a fixed-size buffer. If the size of the A-Buffer 144 for a given image frame turns out to be larger than the size of the fixed-size buffer, then the CPU 102 subdivides the image frame into image subsets. The CPU 102 ensures that each image subset fits within the preallocated fixed-size buffer and then configures the GPU 130 to process each image subset separately. In alternative embodiments, the GPU may reallocate the A-Buffer for each image frame, allocating only enough memory to store the A-Buffer specific to the image frame.

Figure 4:
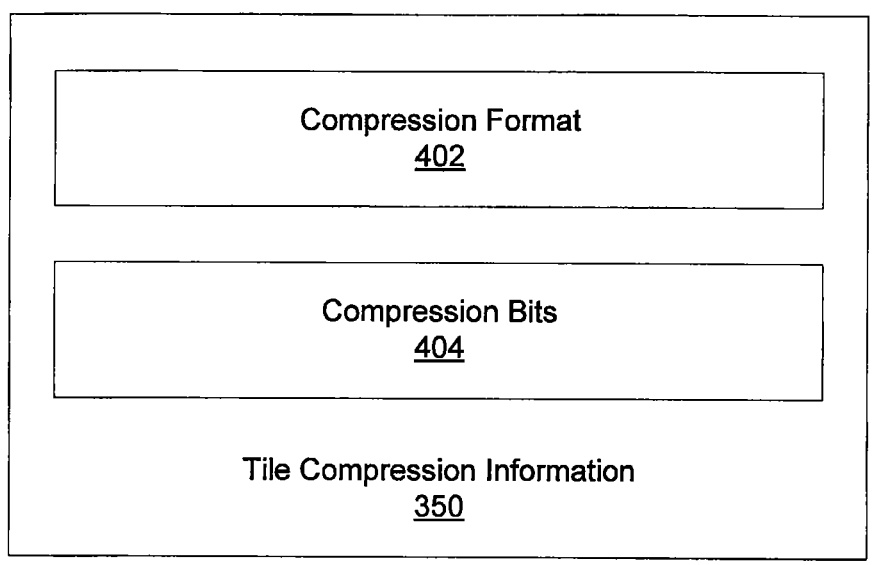
FIG. 4 illustrates a more detailed diagram of the tile compression information of FIG. 3B, according to one embodiment of the invention.

FIG. 4 illustrates a more detailed diagram of the tile compression information 350 of FIG. 3B, according to one embodiment of the invention. The tile compression information 350 includes a compression format 402 and compression bits 404. If the tile 320 is compressed, the compression format 402 specifies the compression format with which the tile 320 is compressed. The compression bits 404 store the compression state of each pixel represented by the tile 320 and/or of each sample included in each of the pixels. For example, the compression format 402 may specify a compression format that allows a two color compression scheme where two colors are stored for each pixel represented by the tile 320. For such an example compression scheme, the compression bits 404 store one bit for each sample included in each of the pixels, indicating which of the two colors is correct for that sample. Further, if the compression format 404 indicates P colors in the pixel, then the GPU 130 may advantageously perform blending and other operations for each color group rather than for each sample.

FIG. 5 is a conceptual diagram of a sample depth complexity image 360 used to determine the structure of the A-Buffer 144, according to one embodiment of the invention. The sample depth complexity image 360 includes a maximum per-sample rendering order index 370 for each of the samples represented by the A-Buffer 144. As shown, the maximum PSROIs 370 are arranged in a K-by-L array, creating a total of K*L maximum PSROIs 370. In the A-Buffer 144 of FIG. 3A, there are S*T stacks of N*M pixels, and each pixel includes F*G samples. Therefore, the A-Buffer represents S*N*F*T*M*G samples, and the corresponding sample depth complexity image 360 for the A-Buffer 144 includes S*N*F*T*M*G maximum PSROIs 370.

As part of determining the structure of the A-Buffer 144, the GPU 130 receives pixel writes indicating the intersection of polygons associated with the various graphics objects in an image frame with the pixels, expands the pixel writes into sample writes, and, for each covered sample, increments the PSROI associated with the covered sample. In this fashion, the GPU 130 configures the maximum PSROIs 370 to represent the maximum rendering order index of every sample in a particular image frame. Subsequently, for each stack 310, the GPU 130 determines the maximum of the subset of maximum PSROIs 370 that correspond to the subset of samples represented by the stack 310. For each stack 310, this stack-specific maximum maximum PSROI determines the number of tiles 320 that the GPU 130 allocates for the stack 310. As will be clear to one skilled in the art, operations on the depth complexity image itself may also be compressed in accordance with existing techniques.

The GPU 130 typically, but not necessarily, uses the fragment shader 212 to create the sample depth complexity images 360 and to determine the structure of the A-Buffer 144. Subsequently, the GPU 130 may use either the raster operations unit 214 or the fragment shader 212 to populate and access the A-Buffer 144. The raster operations unit 214 may be more efficient at performing some A-Buffer 144 operations; however, since the fragment shader 212 may execute a machine code geometry shading program, the fragment shader 212 may be more flexible.

Figure 6A:
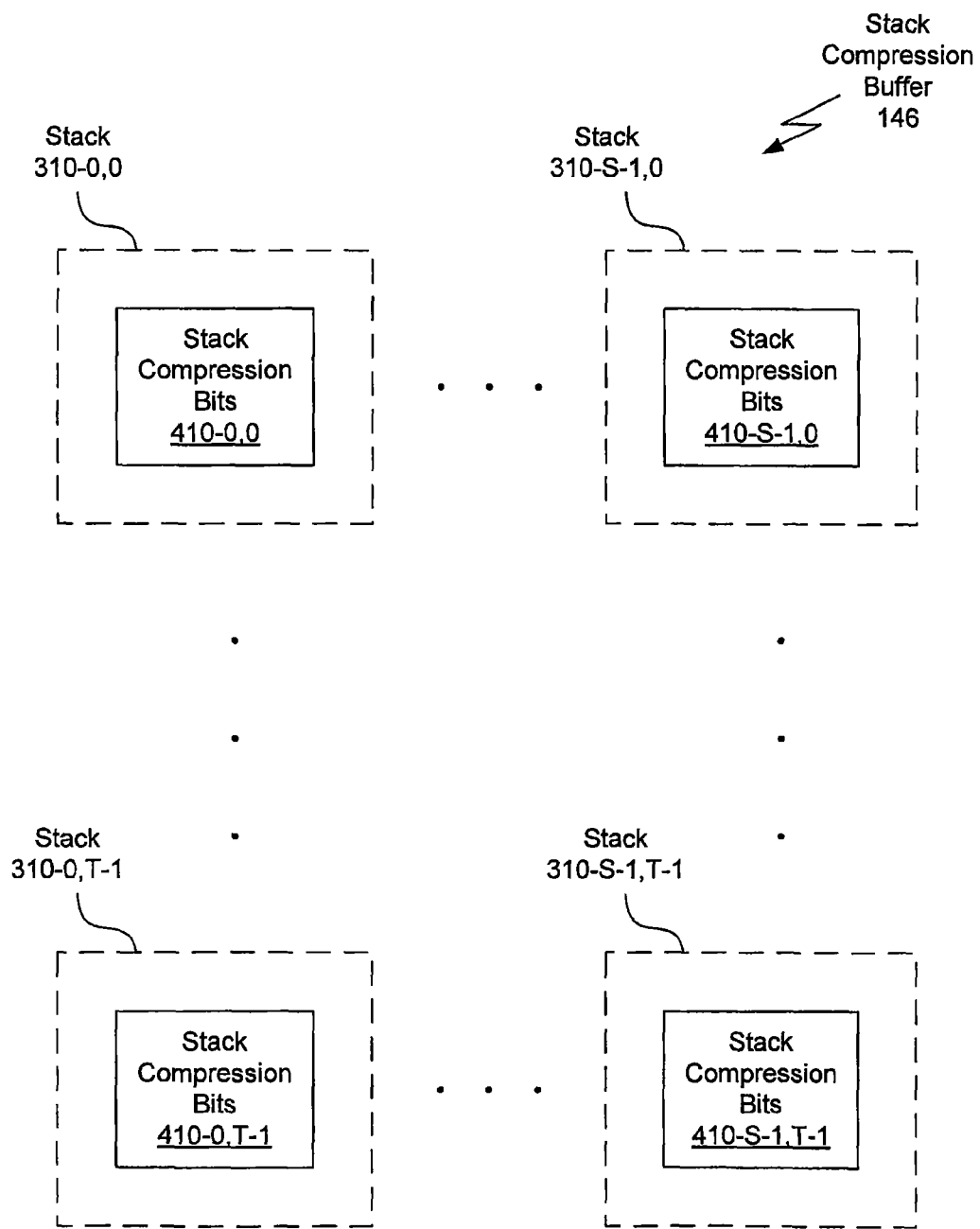
FIG. 6A is a conceptual diagram of a stack compression buffer associated within the A-Buffer of FIG. 3A, according to one embodiment of the invention.

FIG. 6A is a conceptual diagram of a stack compression buffer 146 associated with the A-Buffer 144 of FIG. 3A, according to one embodiment of the invention. As shown, the stack compression buffer 146 includes separate stack compression bits 410 for each stack 310 included in the A-Buffer 144. For each stack 310, the stack compression bits 410 enable the GPU 130 to efficiently determine whether all of the tiles 320 included in the stack 310 are similarly compressed.

Figure 6B:
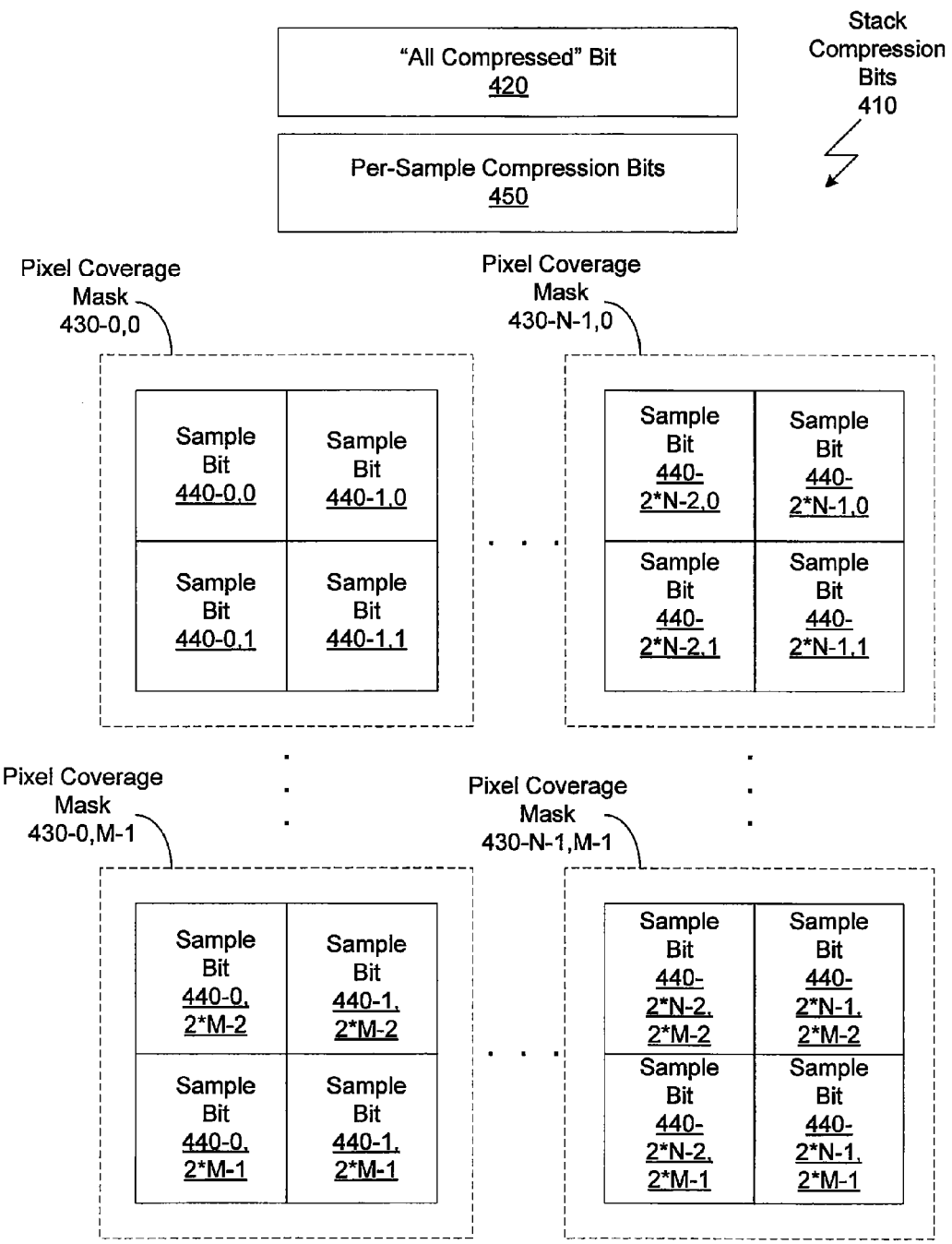
FIG. 6B is more detailed diagram of the stack compression buffer of FIG. 6A, according to one embodiment of the invention.

FIG. 6B is more detailed diagram of the stack compression buffer 146 of FIG. 6A, according to one embodiment of the invention. As shown, the stack compression bits 410 associated with a particular stack 310 include an "all compressed" bit 420 that indicates whether all of the tiles 320 included in the stack 310 are similarly compressed. If all of the tiles 320 included in the stack 310 are similarly compressed, then the GPU 130 may perform blending and other operations between tiles in the same stack using the compressed pixel representation instead of the sample representation of the pixels in the group of pixels represented by the stack 310. Thus, the "all compressed" bit 420 indicates whether the GPU 130 can operate on the stack 310 at the more efficient pixel level, as opposed to the less efficient sample level.

The stack compression bits 410 associated with a particular stack 310 also include per-sample compression bits 450 that store the compression state of each sample included in the pixels of the first tile stored in the stack 310. In addition, the stack compression bits 410 associated with a particular stack 310 also include an N-by-M set of pixel coverage masks 430, selected and arranged to correspond to the N-by-M group of pixels represented by the stack 310. Each pixel coverage mask 430 includes an F-by-G set of sample bits 440. The set of sample bits 440 includes a separate sample bit 440 for each sample included in the pixel. In the example of FIG. 6B, each pixel includes four samples arranged in a two-by-two array. Consequently, each pixel coverage mask 430 also includes four sample bits 440 arranged in a two-by-two array. For each pixel coverage mask 430, the included sample bits 440 indicate a specific coverage of the corresponding pixel on a per sample basis. For example, the sample bits 440 included in a particular pixel coverage mask 430 may be set to the same value, indicating that all of the samples included in the corresponding pixel are covered by the same polygon.

In some embodiments, the per-sample compression bits 450 and the set of pixel coverage masks 430 included in the stack compression bits 410 are evaluated only when the "all compressed" bit 420 is set to true. When the "all compressed" bit 420 is set to true, compression bits 404 within the compression information 350 of each of the tiles 320 included in the stack 310 corresponding to the stack compression bits 410 is the same, matching the per-sample compression bits 450 stored in the stack compression bits 410. Similarly, the sample coverage of each of the tiles 320 included in the stack 310 corresponding to the stack compression bits 410 is the same, matching the sample bits 440 in the set of pixel coverage masks 430.

While populating the A-Buffer 144, the GPU 130 also populates the stack compression buffer 146. When the GPU 130 writes the first tile 320 to a particular stack 310, the GPU 130 initializes the stack compression bits 410 corresponding to the stack 310. If the first tile 320 in a particular stack 310 is compressed, as indicated by the tile compression information 350, then the GPU 130 sets the "all compressed bit" 420 to true. The GPU 130 also sets the per-sample compression bits 450 to the compression bits 404 included in the tile 320. In addition, the GPU 130 initializes the set of pixel coverage masks 430 to depict the coverage of the samples included in the first tile 320 in the stack 310. Subsequently, as the GPU 130 adds each additional tile 320 to the stack 310, if the GPU 130 determines that the additional tile 320 and the first tile in the stack 310 are not similarly compressed, then the GPU 130 sets the "all compressed bit" 420 to false.

In operation, a particular tile 320 included in a particular stack 310, and the first tile 320 included in the stack 310 are similarly compressed when two criteria are met. The first criterion is that both of the tiles 320 are compressed in the same fashion. The GPU 130 makes this determination by comparing the compression bits 404 within the tile compression information 350 included in the particular tile 320 to the per-sample compression bits 450 within the stack compression bits 410. The second criterion is that the per sample coverage of the tiles 320 match. In other words, the coverage of each sample included in the particular tile 320 should match the coverage of the corresponding sample included in the first tile 320. The GPU 130 makes this second determination by comparing the sample coverage of the particular tile 320 to the set of pixel coverage masks 430 associated with the stack 310.

In alternative embodiments, the stack compression buffer may include an "all compressed" bit corresponding to each stack in the A-Buffer and the per-sample compression bits 450, but may not include pixel coverage masks. In such an embodiment, the GPU may determine that all of the tiles in a particular stack are similarly compressed when all of the tiles included in the stack are compressed in the same fashion (i.e., the compression bits 404 included in the tiles are the same).

Again, the GPU 130 may use either the raster operations unit 214 or the fragment shader 212 to populate and access the stack compression buffer 146. In alternative embodiments, the information in the stack compression buffer may be stored in any technically feasible fashion using any number and type of data structures. In other embodiments, the GPU may not maintain any stack compression information in conjunction with the A-Buffer and, consequently, the stack compression buffer may not exist.

Figure 7:
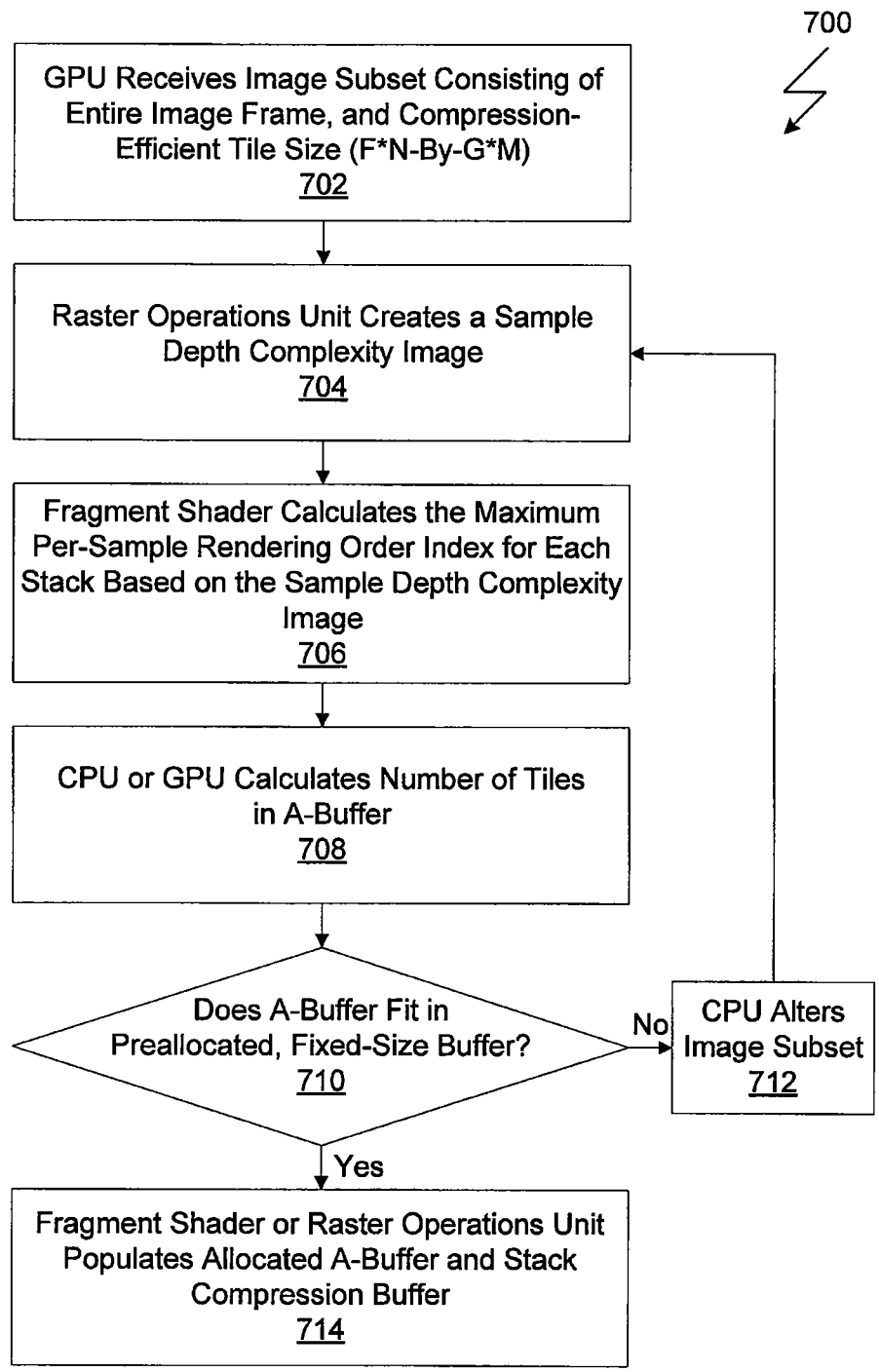
FIG. 7 is a flow diagram of method steps for allocating the A-Buffer of FIG. 1 and the associated stack compression buffer, according to one embodiment of the invention.

FIG. 7 is a flow diagram of method steps for allocating the A-Buffer 144 of FIG. 1 and the associated stack compression buffer 146, according to one embodiment of the invention. Although the method steps are described in conjunction with the systems for FIGS. 1-6B, persons skilled in the art will understand that any system that performs the method steps, in any order, is within the scope of the invention.

The method 700 begins at step 702, where the GPU 130 receives an image subset consisting of an entire image frame and a compression-efficient tile size, F*N-by-G*M. As described above in conjunction with FIG. 3A, the tile size corresponds to the size of the group of samples represented by each of the stacks 310 in the A-Buffer 144. At step 704, the raster operations unit 214 creates a sample depth complexity image 360 by calculating the maximum rendering order index for each sample included in the image subset. A series of method steps for calculating a sample depth complexity image 360 is described in greater detail below in FIG. 8.

At step 706, the fragment shader 212 calculates the maximum PSROI for each stack 310 in the A-Buffer 144 based on the sample depth complexity image 360. More specifically, the fragment shader 212 divides the sample depth complexity image 360 into F*N-by-G*M groups of maximum PSROIs 370, where F*N-by-G*M is the tile size received in step 702. As part of step 706, the fragment shader 212 assigns each F*N-by-G*M group of samples to a specific stack 310 in the A-Buffer 144. Also as part of step 706, the fragment shader 212 evaluates the maximum PSROI 370 of each of the samples associated with each of the F*N-by-G*M groups of samples and determines a single maximum maximum per-sample rendering order index for each F*N-by-G*M group of samples. The single maximum maximum PSROI defines the number of tiles 320 assigned to the stack 310 in the A-Buffer 144 associated with the F*N-by-G*M group of samples.

At step 708, the CPU 102 or the GPU 130 calculates the total number of tiles 320 in the A-Buffer 144. In one embodiment, the CPU sums the total number of tiles 320 assigned to each of the stack 310 in the A-Buffer 144 to determine the total number of tiles 320 in the A-Buffer 144. At step 710, if the CPU 102 or the GPU 130 determines that the size of the A-Buffer 144 is not supported by a preallocated, fixed-sized buffer, then the method 700 proceeds to step 712. The determination of whether the size of the A-Buffer 144 is supported by the preallocated, fixed-size buffer may be made in any technically feasible fashion. For example, the total number of tiles required to represent the A-Buffer may be compared with the total number of tiles that may be represented using the preallocated, fixed-size buffer. At step 712, the CPU 102 alters the image subset (e.g., the CPU may halve the image subset), and the method 500 returns to step 704. The method 700 continues in this fashion, looping through steps 704-712, until an image subset is identified that fits in the preallocated, fixed-size buffer reserved for the A-Buffer structure.

If, at step 710, the CPU 102 or the GPU 130 determines that the size of the A-Buffer 144 is supported by the preallocated, fixed-size buffer, then the method 700 proceeds to step 714. At step 714, the fragment shader 212 or the raster operations unit 214 populates the preallocated A-Buffer 144 and the associated stack compression buffer 146 using the various sample data associated with the image subset, as described herein, and the method 700 terminates.

Figure 8:
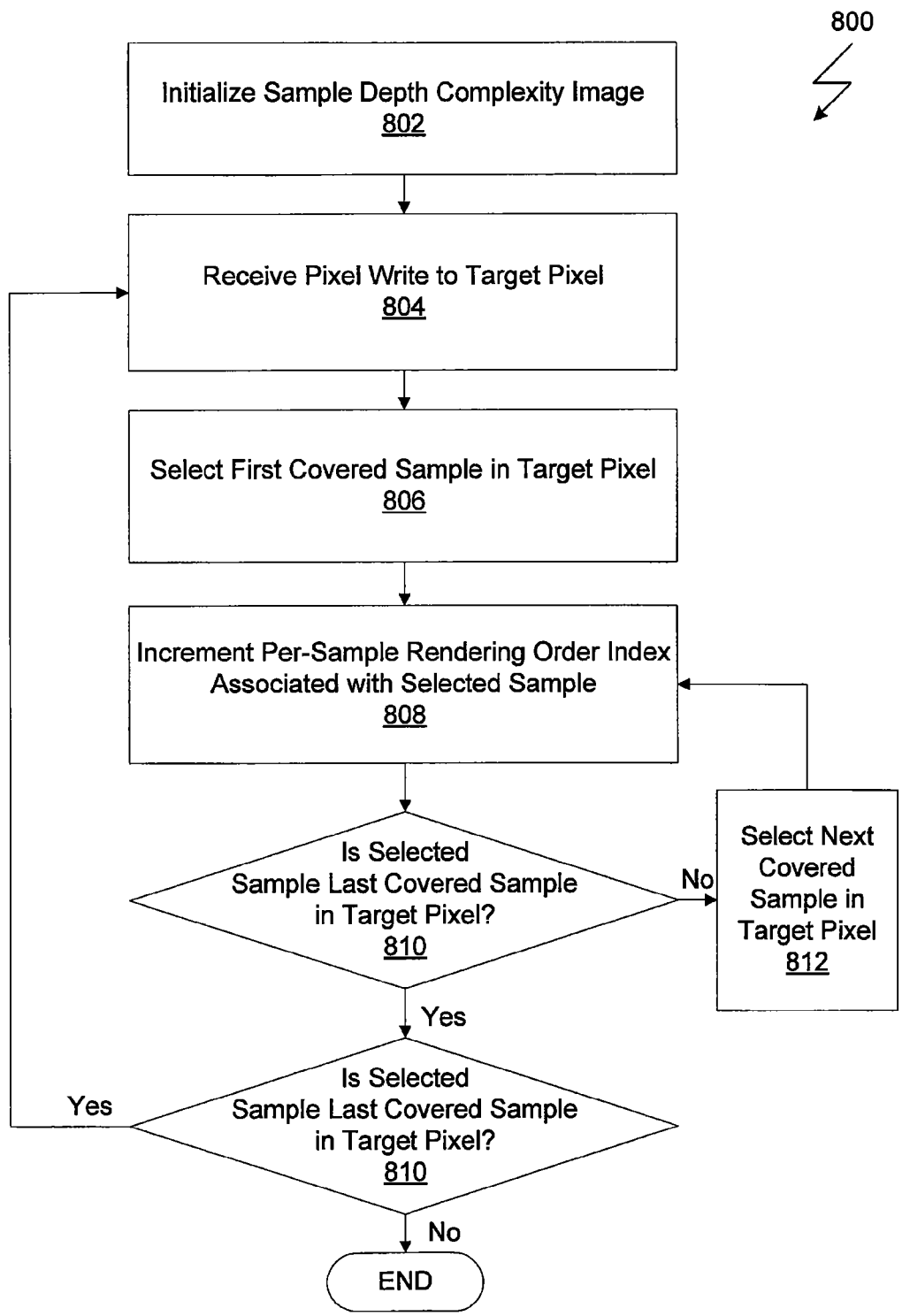
FIG. 8 is a flow diagram of method steps for creating the sample depth complexity image of FIG. 5, according to one embodiment of the invention.

FIG. 8 is a flow diagram of method steps for creating the sample depth complexity image 360 of FIG. 5, according to one embodiment of the invention. Although the method steps are described in conjunction with the systems for FIGS. 1-6B, persons skilled in the art will understand that any system that performs the method steps, in any order, is within the scope of the invention. Further, although the method steps are described as being performed by the raster operations unit 214, the fragment shader 212 may perform one or more of the method steps instead of the raster operations unit 214 or in conjunction with the raster operations unit 214.

As shown, the method 800 begins at step 802, where the raster operations unit 214 initializes the sample depth complexity image 360 by setting all of the maximum PSROIs 370 included in the sample depth complexity image 360 to zero. At step 804, the raster operations unit 214 receives a write to a target pixel. At step 806, the raster operations unit 214 selects the first covered sample in the target pixel. The raster operations unit 214 may order the samples in any technically feasible fashion, such as primarily by X-coordinates and secondarily by Y-coordinates. At step 808, the raster operations unit 214 increments the maximum PSROI 370 associated with the selected sample. At step 810, if the raster operations unit 214 determines that the selected sample is not the last covered sample included in the target pixel, then the method 800 proceeds to step 812.

At step 812, the raster operations unit 814 selects the next covered sample in the target pixel, and the method 800 returns to step 808, where the raster operations unit 214 increments the maximum PSROI 370 associated with the selected sample. The method 800 continues in this fashion, looping through steps 808-812, until the raster operations unit 214 increments each of the sample depth complexities 370 that are associated with a covered sample in the target pixel.

If, at step 810, the raster operations unit 214 determines that the selected sample is the last covered sample in the target pixel, then the method 800 proceeds to step 814. At step 814, if the raster operation unit 214 determines that there are more pixel writes, then the method 800 returns to step 804, where the raster operations unit 214 receives a pixel write to a target pixel. The method 800 continues in this fashion, looping through steps 804-814, until the raster operations unit 214 receives all of the pixel writes and reflects the pixel writes in the sample depth complexity image 360.

Figure 9:
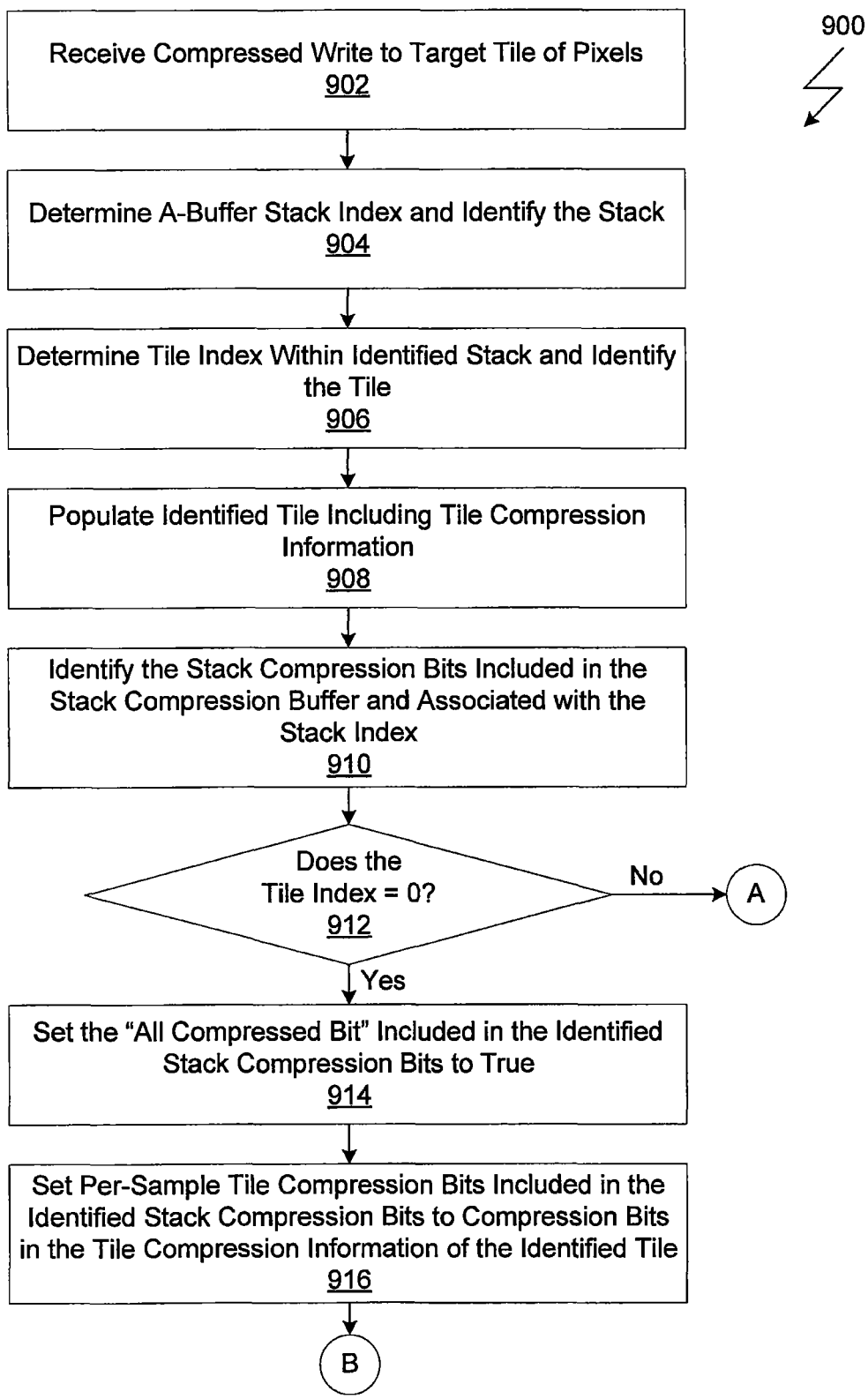
FIG. 9 is a flow diagram of method steps for writing a compressed tile to the A-Buffer of FIG. 1, according to one embodiment of the invention.
Figure 9:
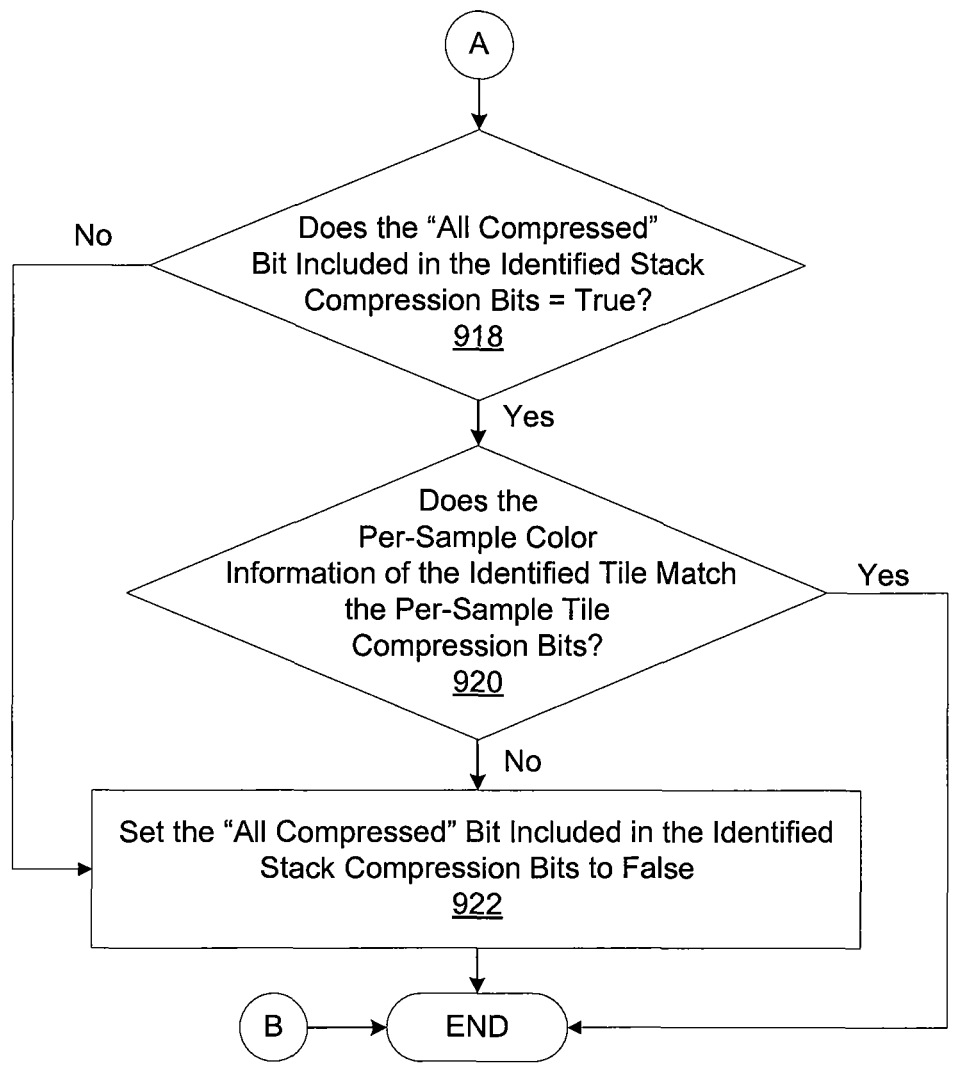

FIG. 9 is a flow diagram of method steps for writing a compressed tile to the A-Buffer 144 of FIG. 1, according to one embodiment of the invention. Although the method steps are described in conjunction with the systems for FIGS. 1-6B, persons skilled in the art will understand that any system that performs the method steps, in any order, is within the scope of the invention. Further, although the method steps are described as being performed by the raster operations unit 214, the fragment shader 212 may perform one or more of the method steps instead of the raster operations unit 214 or in conjunction with the raster operations unit 214.

As shown, the method 900 begins at step 902, where the raster operations unit 214 receives a compressed write to a target tile of pixels. At step 904, the raster operations unit 214 determines the A-Buffer stack index and identifies the stack 310 associated with the stack index and included in the A-Buffer 144. The raster operations unit 214 may determine the two-dimensional stack index in any technically feasible fashion. For example, the raster operations unit may use the tile size of the A-Buffer to calculate the stack index using integer division operations. At step 906, the raster operations unit 214 determines the tile index within the identified stack 310 and identifies the tile 320 associated with the tile index and included in the identified stack 310. The raster operations unit 214 may determine the one-dimensional tile index in any technically feasible fashion. For example, the raster operations unit may maintain an index for each stack that indicates the index of the next unpopulated tile, and the raster operations unit may set the tile index to match the index of the next unpopulated tile for the identified stack.

At step 908, the raster operations unit 214 populates the identified tile 320 using the data received during the compressed write. As part of step 908, the raster operations unit 214 updates the tile compression information 350 included in the identified tile 320 to reflect the compression format for the identified tile 320. At step 910, the raster operations unit 214 identifies the stack compression bits 410 included in the stack compression buffer 146 and associated with the stack index. At step 912, if the raster operations unit 214 determines that the tile index equals zero (i.e., the identified tile 320 is the first tile 320 in the identified stack 310), then the method 900 proceeds to step 914.

At step 914, the raster operations unit 214 sets the "all compressed" bit 420 included in the identified stack compression bits 410 to true. In other words, the raster operations unit 214 sets the "all compressed" bit 420 included in the identified stack compression bits 410 to indicate that the single tile 320 in the identified stack 310 is compressed. At step 916, the raster operations unit 214 sets the per-sample compression bits 450 included in the identified stack compression bits 410 to the compression bits 404 included in the compression information 350 of the identified tile 320, and the method 900 terminates.

If, at step 912, the raster operations unit 214 determines that the tile index does not equal zero (i.e., the identified tile 320 is not the first tile 320 in the identified stack 310), then the method 900 proceeds to step 918. At step 918, if the raster operations unit 214 determines that the value of the "all compressed" bit 420 included in the identified stack compression bits 410 is not equal to true, then the method 900 terminates. If, at step 918, the raster operations unit 214 determines that the value of the "all compressed" bit 420 included in the identified stack compression bits 410 is equal to true, then the method 900 proceeds to step 920.

At step 920, the raster operations unit 214 determines whether the compression bits 404 included in the identified tile 320 match the per-sample compression bits 450 included in the identified stack 310. In such a fashion, the raster operations unit 214 determines whether the identified tile 320 is compressed in a similar manner as all of the previous tiles 320 in the identified stack 310. As previously described herein, the compression bits 404 included in the identified tile 320 indicate the compression state of each pixel within the tile 320 and/or each sample included in the pixels within the tile 320. For example, if each sample included in each of the pixels has one of two colors, the compression bits store one bit for each sample, indicating which of the two colors is correct for that sample.

At step 920, if the per-sample compression bits 450 and the compression bits 404 do not match, then the identified tile 320 is not compressed in the same manner as all of the previous tiles 320 included in the identified stack 310 and the method proceeds to step 922. At step 922, the raster operations unit 214 sets the "all compressed" bit 420 included in the identified stack compression bits 410 to false, and the method 900 terminates.

If, at step 920, the per-sample compression bits 450 and the compression bits 404 do match, then the identified tile 320 is compressed in the same manner as all of the previous tiles 320 included in the identified stack 310 and the "all compressed" bit 420 remains set to true. The method 900 then terminates.

In sum, image rendering performance may be improved by using an A-Buffer structure that allows sample data to be stored in a way that increases the memory locality and supports existing compression techniques. The A-Buffer is organized in three-dimensional stacks of uniformly-sized two-dimensional rectangular tiles, each stack representing a group of pixels and the samples included in the group of pixels. Each tile in a given stack includes the set of sample data associated with the group of pixels represented by the stack and also includes tile compression bits.

For a particular tile, the tile compression information may specify a tile compression format that is supported by the GPU and compression bits indicating the compression status of each pixel in the tile and/or of each sample within the pixels in the tile. In one embodiment, the compression format may specify a compression format that allows a two color compression scheme where two colors are stored for each pixel represented by the tile. For such a compression scheme, the compression bits store one bit for each sample included in each of the pixels, indicating which of the two colors is correct for that sample.

Further, during A-Buffer creation, a corresponding stack compression buffer is created. For each stack in the A-Buffer, the stack compression buffer includes an "all compressed" bit that indicates whether all of the tiles in the stack are similarly compressed. If the tile compression bits associated with all the tiles in a particular stack are the same, then the "all compressed" bit is set to true. The "all compressed" bit may be used by the GPU to determine whether to operate on the data included in a particular stack on a more efficient per pixel basis or a less efficient per sample basis.

Advantageously, the compression information, including the compression format and the compression bits, in each tile allows the GPU to create a stack compression buffer indicating whether the tiles in a stack are all similarly compressible. Such a technique enables the GPU to fully utilize existing compression techniques that reduce memory bandwidth and increase computational efficiency. Consequently, the overall performance of the graphics pipeline is improved.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

I claim:

1. A method for storing in a graphics processing unit (GPU) memory pixel data associated with one or more pixels in an image, the method comprising:
   identifying within a buffer residing within the GPU memory a first stack associated with a first set of pixels included in the image, wherein each stack stored in the buffer is associated with a different set of pixels included in the image, and wherein a first set of stack compression bits associated with the first stack includes an all-compressed bit;
   populating a first tile included in the first stack with pixel data associated with a first subset of pixels included in the first set of pixels, wherein each tile included in the first stack stores pixel data associated with a different subset of pixels included in the first set of pixels;
   generating tile compression information associated with the first tile based on the pixel data associated with the first subset of pixels, wherein the tile compression information specifies a compression format used to compress the pixel data associated with the first subset of pixels and a compression state associated with each pixel in the first subset of pixels; and
   storing the tile compression information in the first tile.

2. The method of claim 1, further comprising the step of determining the number of tiles in the first stack populated with different pixel data based on a tile index associated with the first stack.

3. The method of claim 2, wherein there are no populated tiles, other than the first tile, in the first stack, and further comprising the steps of:
   setting the all-compressed bit included in the first set of stack compression bits associated with the first stack to TRUE; and
   setting per-sample compression bits in the first set of stack compression bits to the compression state included in the tile compression information associated with the first tile.

4. The method of claim 2, wherein there is at least one populated tile in the first stack, other the first tile, and further comprising the step of determining the value of the all-compressed bit in the first set of stack compression bits associated with the first stack.

5. The method of claim 4, wherein the value of the all compressed bit is TRUE, and further comprising the step of matching per-sample compression bits in the first set of stack compression bits to the compression state included in the tile compression information associated with the first tile.

6. The method of claim 5, wherein the per-sample compression bits and the compression state do not match, and further comprising the step of setting the all-compressed bit in the first set of stack compression bits to FALSE.

7. The method of claim 5, wherein the per-sample compression bits and the compression state match, and the all-compressed bit in the first set of stack compression bits remains set to TRUE.

8. The method of claim 1, wherein each pixel in the group of pixels includes a plurality of samples.

9. The method of claim 8, wherein the compression format comprises a two-color compression format, and the compression state associated with each pixel specifies either a first color or a second color for each sample included in the pixel.

10. The method of claim 8, wherein each tile includes only sample data, corresponding to the plurality of samples, at a given per-sample rendering order index (PSROI).

11. The method of claim 8, further comprising creating a sample depth complexity image by calculating a maximum rendering order index for each sample in the plurality of samples.

12. The method of claim 1, wherein the compression format comprises a one-color compression format, and the compression state associated with each pixel specifies a first color for the pixel.

13. The method of claim 1, wherein the first set of stack compression bits includes a set of pixel coverage masks corresponding to the set of pixels associated with the first stack.

14. The method of claim 13, wherein the pixel coverage masks are evaluated only when the all-compressed bit is set to TRUE.

15. A computer system, comprising:
   a graphics processing unit (GPU) memory including a buffer for storing pixel data associated with one or more pixels in an image; and
   a GPU coupled to the GPU memory and configured to:
      identify within the buffer a first stack associated with a first set of pixels included in the image, wherein each stack stored in the buffer is associated with a different set of pixels included in the image, and wherein a first set of stack compression bits associated with the first stack includes an all-compressed bit,
      populate a first tile included in the first stack with pixel data associated with a first subset of pixels included in the first set of pixels, wherein each tile included in the first stack stores pixel data associated with a different subset of pixels included in the first set of pixels,
      generate tile compression information associated with the first tile based on the pixel data associated with the first subset of pixels, wherein the tile compression information specifies a compression format used to compress the pixel data associated with the first subset of pixels and a compression state associated with each pixel in the first subset of pixels, and
      store the tile compression information in the first tile.

16. The computer system of claim 15, wherein the GPU is further configured to determine the number of tiles in the first stack populated with different pixel data based on a tile index associated with the first stack.

17. The computer system of claim 16, wherein there are no populated tiles, other than the first tile, in the first stack, and the GPU is further configured to:
   set the all-compressed bit included in the first set of stack compression bits associated with the first stack to TRUE; and
   set per-sample compression bits in the first set of stack compression bits to the compression state included in the tile compression information associated with the first tile.

18. The computer system of claim 16, wherein there is at least one populated tile in the first stack, other the first tile, and the GPU is further configured to determine the value of the all-compressed bit in the first set of stack compression bits associated with the first stack.

19. The computer system of claim 18, wherein the value of the all compressed bit is TRUE, and the GPU is further configured to match per-sample compression bits in the first set of stack compression bits to the compression state included in the tile compression information associated with the first tile.

20. The computer system of claim 19, wherein the per-sample compression bits and the compression state do not match, and the GPU is further configured to set the all-compressed bit in the first set of stack compression bits to FALSE.

21. The computer system of claim 19, wherein the per-sample compression bits and the compression state match, and the all-compressed bit in the first set of stack compression bits remains set to TRUE.

22. The computer system of claim 15, wherein each pixel in the group of pixels includes a plurality of samples.

23. The computer system of claim 22, wherein the compression format comprises a two-color compression format, and the compression state associated with each pixel specifies either a first color or a second color for each sample included in the pixel.

24. The computer system of claim 15, wherein the compression format comprises a one-color compression format, and the compression state associated with each pixel specifies a first color for the pixel.

* * * * *